United States Patent [19]

Vesely

[11] Patent Number: 4,566,169
[45] Date of Patent: Jan. 28, 1986

[54] SET OF PARTS FOR BUILDING SMALL MACHINE TOOLS

[75] Inventor: Gottfried Vesely, Groedig, Austria

[73] Assignee: Maier & Co., Hallein, Austria

[21] Appl. No.: 559,904

[22] Filed: Dec. 9, 1983

[30] Foreign Application Priority Data

Jan. 10, 1983 [DE] Fed. Rep. of Germany ....... 3300553

[51] Int. Cl.⁴ .............................................. B23B 47/00
[52] U.S. Cl. .................................... 29/560; 29/26 A; 29/27 A; 408/234; 409/241
[58] Field of Search ..................... 29/560, 26 A, 27 R, 29/27 A; 408/234; 409/240, 241; 82/6 R, 6 A

[56] References Cited

U.S. PATENT DOCUMENTS

| | | | |
|---|---|---|---|
| 1,469,226 | 10/1923 | Langhammer | 82/6 R |
| 2,028,727 | 1/1936 | Perry et al. | 408/234 |
| 2,052,600 | 9/1936 | Boss | 408/234 X |
| 3,680,438 | 8/1972 | Good et al. | 408/234 X |
| 3,709,622 | 1/1973 | Morse | 29/560 X |
| 3,867,054 | 2/1975 | Muller | 408/234 |

FOREIGN PATENT DOCUMENTS

2025282  1/1980  United Kingdom ............... 29/27 A

Primary Examiner—Gil Weidenfeld
Assistant Examiner—Glenn L. Webb
Attorney, Agent, or Firm—McCormick, Paulding & Huber

[57] ABSTRACT

A building set is provided including at least a drive motor, a spindle stock and a support element for holding these elements. These elements can be assembled to form a variety of small machine tools. The elements are formed as independent parts with under cut clamping grooves. The elements are joined together at their clamping grooves by a connecting element.

2 Claims, 24 Drawing Figures

SET OF PARTS FOR BUILDING SMALL MACHINE TOOLS

The invention concerns a set or kit of parts for building small machine tools with the set including at least a drive motor, a spindle stock and a support element for holding these parts.

There are on one hand known large machine tools for use in work places and factories which by the addition, removal and change of parts can be varied to a certain extent to make possible the carrying out of different work processes through the use of the same basic elements. A high precision is demanded of such machine tools and they must meet strict safety requirements. This generally allows a conversion of the machine tools only to a very limited extent, frequently complicated components have to be used and the conversion requires a considerable amount of time.

Further sets of parts for building small machine tools are known especially for the home workshop, the basic element of such set generally being a hand drill which is combinable with a certain number of supplemental devices to make a machine tool. A disadvantage of these sets is that with the exception of the hand drill all of the devices of the set are used always only to form one type of machine. In order to have a building set with which a plurality of work processes are capable of being performed, it is necessary that one have a large number of supplemental devices so that the entire system is very wasteful and expensive.

The invention has as its object to provide a building set of the previously mentioned type having the possibility of combining different basic elements with one another so that with a small number of such basic elements, and if necessary a limited number of additional elements, small machine tools can be assembled in small amounts of time which with respect to their performance satisfy the demands of hobbyists and model builders.

This object is solved by way of the invention in that the drive motor, the spindle stock, and the support element are all formed as independent parts, that the parts of the building set which are joinable with one another have at least one bearing face in which at least one undercut clamping groove is formed and that a connecting element is provided which is insertable in the clamping grooves of two parts which are to be joined, which connecting element is rigidly clampable in the clamping grooves by means of at least one tightening element.

As will be apparent from the additional description which follows concerning embodiments of the invention, the separation of the motor, spindle stock and support element makes possible as well as combinations of the proposed type the combination of these and further building components, and on the other hand a plurality of machine variations can be built with a small amount of time and a small number of different parts. For connecting two parts it is sufficient that they be laid with their clamping grooves adjacent to one another so that a connecting element can be simultaneously inserted in both of the clamping grooves and can be clamped to both of the clamping grooves with the help of the tightening element. The connecting element can therefore be fastened in any desired position or location of the clamping grooves.

Preferably the connecting element consists of two individual sections, connected with one another, whose cross sections correspond with the cross sections of the clamping grooves. In this way a sure connection between the two parts to be joined is achieved. The individual sections can be arranged parallel to one another or at an angle to one another. In the first case the two building parts are pressed toward one another by the connecting element and their clamping grooves are arranged parallel to one another. In the second case the connection between two building parts can be made by means of the connecting element such that their clamping grooves cross one another at the angle provided by the connecting element. In order that two building parts can be so connected to one another that their clamping grooves cross one another at a desired angle one of the individual sections of the connecting element can be made so as to have rotational symmetry about an axis perpendicular to the imaginary separating plane between the two individual sections. This connecting element may be rotated in one of the clamping grooves while in the other clamping groove it can only be slid only along the length of the groove.

A clamping of the connecting element in a desired place in the clamping grooves can be achieved in a simple way by having the connecting element include at least two portions which are pivotal by means of the tightening element about an axis perpendicular to the longitudinal direction of the section or groove. Through this pivoting the portions tilt in the groove and in this way tighten the building parts to be connected to one another. In a simple and economical embodiment of the connecting elements they are made in one piece out of plastic so that a material bridge is formed between the two portions, which bridge acts as a joint between the two portions. In order that the connecting element can be fastened at a desired location of the clamping grooves the tightening element must be operable from the groove. In a simple way this is possible if the tightening element is provided by a screw adjustable in the longitudinal direction of the section or groove. The screw can for example be threaded into one portion of the connecting element and can bear against the second portion of the connecting element which is pivotally connected with the first portion, so that the two portions of the connecting element can be spread apart by means of the screw to tilt them relative to the clamping groove. It is however also possible to pull together the portions of the connecting element which are pivotally connected to one another, and which are spaced from one another by a gap, by means of a screw and nut in which case the portions are also tilted in the clamping groove. In both cases the screw can be operated by a screwdriver inserted in the clamping groove. No opening need be provided in either of the building parts to be connected to one another for operating the tightening element, which would have the disadvantage that the connecting element could only be clamped at the positions which correspond to such openings.

In accordance with another embodiment, the invention consists of the connecting element being made of an elastic material so that its cross sectional shape can be reversibly changed by the tightening element. In this case the tightening element also for example can be made of a screw and a nut between which the connecting element is compressed for change of its cross sectional shape.

Preferably the clamping grooves have T-shaped sections and the connecting element has a double T-shaped section. This T-shaped section is simple to make and offers in the case of a connecting element made of plastic a high mass to assure against the breaking of the element from out of the groove. However, other section shapes can be selected for the undercut clamping grooves and the connecting element, as for example a dovetail-shaped section.

In order to suit the spindle speed to the work at hand the building set can include at least one transmission block which on one hand is couplable with the drive motor and on the other hand with the spindle stock.

A maximum number of combination possibilities of the different parts of the construction set is achieved however in that at least the spindle stock, the transmission block and the support element have a rectangular external shape and as to length at least two of the rectangular edges are congruent, with the clamping groove being directed parallel to the third rectangular edge. The support element can for example be used as well for a machine bed as for a post, with the drive motor, the spindle stock or the transmission block, as well as other parts of the building set, being capable of being fastened to all of its faces provided with a clamping groove. The congruence of at least a portion of the edge lengths of the building elements guarantees that these can be set against one another as building blocks. Simultaneously it is assured that the building components because their flat outer surfaces have in each position a flat supporting surface with which it can be laid on a work table or other undersupport. The symmetry and therewith also the versatility of the components of the building set is further increased in that the clamping grooves run midway between the edges which run parallel to it of the surfaces in which they are formed.

In the case of an especially preferred embodiment, at least the spindle stock, the transmission block and the carrier element have a square cross section perpendicular to the surfaces containing the clamping grooves.

In order, for example, to be able to connect a lying support element with a standing support element there arises the possibility to provide a bore in the carrier elements so that the parts under use can be connected to one another by fastening bolts. In this case a connection is only possible at the location of the bores. Another possibility consists in connecting the two parts through a connecting element which has section profiles arranged perpendicular to one another as has already been explained above. Finally the connection can be made through the use of a rectangular intermediate part which on at least two opposite faces has at least one clamping groove with the clamping groove of one face being oriented perpendicular to the clamping groove in the other face. At the same time the intermediate part can also serve as a workpiece carrier and fill further functions which are explained in greater detail below in connection with the description of the embodiments.

Especially for turning and milling work and even for a post-type drill press it is convenient if the construction set includes at least one slide arrangement having one slide carrier of substantially rectangular shape and a slide slidably mounted thereon, with the slide carrier having at least one clamping groove arranged parallel to the movement direction of the slide which groove is located in the external surface parallel to the movement direction of the slide and with the upper side of the slide having at least one clamping groove arranged parallel to the movement direction of the slide and one clamping groove arranged perpendicular to the movement diection of the slide. With the help of the clamping grooves on the slide carrier and on the slide both parts can be connected with other parts of the construction set.

The slide can serve for holding workpieces as well as for holding work tools such as, for example, a tool bit. In contrast to customary machines the slide is also not guided on the machine bed but has its own guide on a slide carrier fixed to the machine bed. This increases the versatility of the building set.

Preferably a further slide arrangement is provided having a slide carrier and a slide slidably guided on the slide carrier with the slide carrier on its underside having a groove dog insertable in a clamping groove, which dog is clampable by a clamping screw accessible from the upper side of the slide carrier, and with the slide on its upper side having at least one clamping groove oriented parallel to the movement direction of the slide and at least one clamping groove oriented perpendicular to the movement direction of the slide. The use of a groove dog in place of a groove on the underside of the slide carrier has the advantage that the slide carrier can be made flatter and that the slide carrier can be turned 360 degrees about the axis of the clamping screw for the groove dog. Therefore it is possible in the case of this second slide to arrange it in any desired position relative to the component on which it is mounted. This gives for example the possibility of advancing a turning tool obliquely to the turning axis of the workpiece. Further possibilities are explained in connection with the embodiments.

The slides of the slide arrangements are conveniently movable by means of a hand operated spindle drive as is in itself known. This spindle drive allows an exact positioning of the slide. In the case of the second slide it is desirable to also provide the possibility that the spindle drive can be made ineffective so that the slide on the slide carrier can be adjusted by means of an adjusting lever. This loosening can be used with advantage in a post-type drill press with the slide carrier being arranged on the post and with the drive motor together with the spindle stock being arranged on the slide. On drilling, the spindle stock, on whose spindle the drill chuck is arranged, can be moved downwardly by means of the adjusting lever during the drilling process.

In a preferred embodiment of the spindle stock the spindle is provided with a through going axial bore. This gives the possibility to also turn workpieces whose axial length is larger than the maximum gripping length of a lathe made from the construction set. The workpiece is fed forwardly through the hollow spindle so that the portion to be worked is clamped between the chuck and the tail stock while the portion not to be worked extends outwardly through the spindle.

The building set according to the invention is especially for laymen or amateurs such as handwork oriented young persons and hobbyists and also for model builders. The size of the construction parts and of the drive motor as well as its power are so chosen that special safety measures need not be taken as with larger machines where they are necessary because of the danger of injury. For the building set according to the invention it is sufficient for example to have an electric motor with a power of about 20 watts which can be driven by batteries or through a transformer. Such a motor can in any event be held still with the hand so that the danger of injury with a machine tool driven by such a motor is only small. On the other hand the power of the motor, especially when using a transmission, is sufficient to work not only plastic and wood, but also metal such as aluminum and even steel. For the battery drive of the drive motor a battery can be provided in a battery receiving chamber of one of the support elements. Preferably such support element can have a high profile which is closable at both of its ends by caps and in which several batteries, such as in a flashlight, can be placed.

Further features and advantages of the invention are apparent from the dependent claims and the following description which in connection with the accompanying drawings explains the invention with respect to embodiments. The drawings are:

Figures 1, 2, 3:
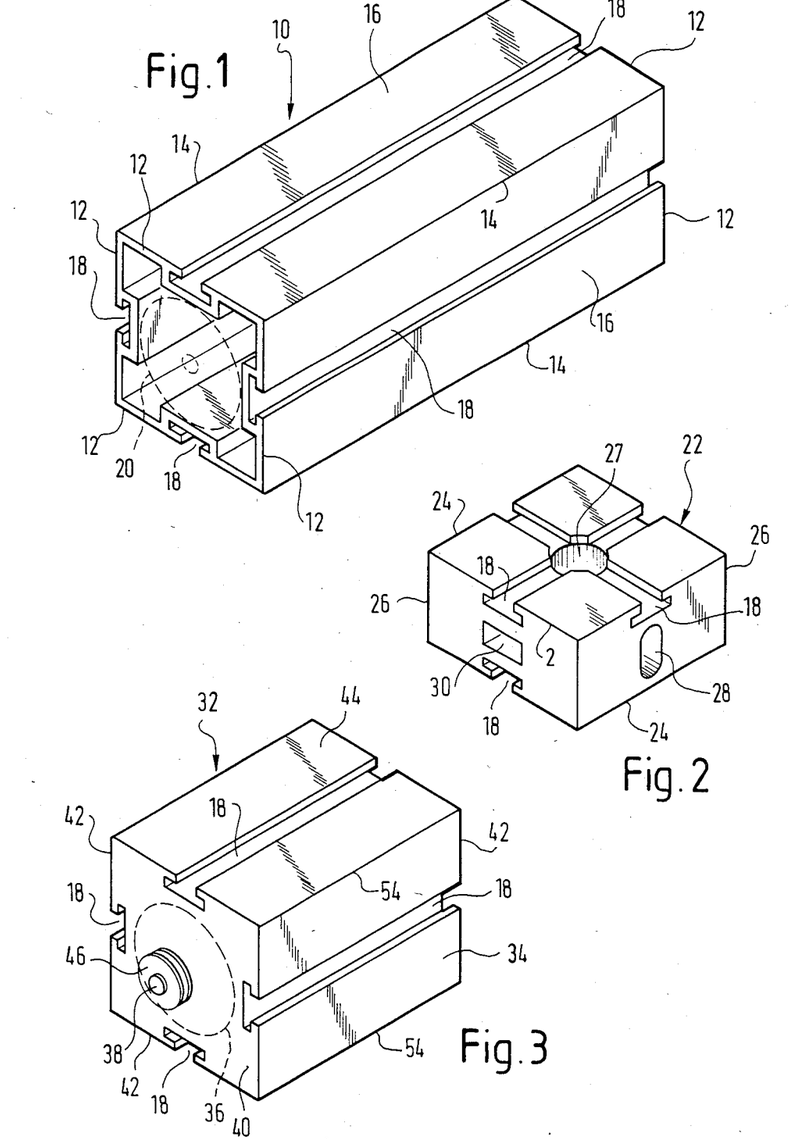
FIGS. 1 to 6 are perspective views respectively of a support element, an intermediate part, a drive motor, a spindle stock, a transmission block and a tail stock.

FIG. 1 shows a rectangular elongated support element, indicated generally at 10, whose short edges 12 are of equal length so that the element 10 has a square cross section. The long edges 14 can be of different length, that is, a building set or kit can contain several support elements of different length. In the outer surface 16 extending along the length of the element and located midway between the two longitudinal edges 14, and extending parallel to such edges, is a clamping groove 18 with a T-shaped cross section. The support element 10 serves to hold other building parts and can for example be used as a machine bed, as a post or as a machine foot, as explained hereinafter in connection with FIGS. 18 to 24.

In the illustrated embodiment the support element consists of a hollow body which serves for the reception of a battery 20, illustrated in broken line, for supplying the electric motor illustrated in FIG. 3. The hollow body can be closed by caps, not illustrated, in which plugs or sockets for making an electrical connection between the battery 20 and the electric motor are arranged.

FIG. 2 shows an intermediate portion, or adapter, 22 also of rectangular form, whose longer edges 24 are of equal length to that of the edges 12 of the support element 10 and whose short edges 26 are essentially half as long as the edges 24. In the upwardly facing surface of the intermediate portion 22, as seen in FIG. 2, are two clamping grooves 18 with T-shaped cross sections arranged perpendicular to one another, which grooves are arranged midway between the two associated edges 24 and parallel to such edges. In the downwardly facing surface of the intermediate part 22, as seen in FIG. 2, is likewise one clamping groove 18 which runs in registration with one of the two clamping grooves in the opposite surface of the intermediate part 22. This intermediate part 22 makes it possible, for example, to connect two support elements 10 perpendicular to one another in one place. At the crosspoint of the two clamping grooves 18 the intermediate part 22 further has a bore 27 running through it perpendicular to the top and bottom sides through which if necessary or desired a spindle can be moved. On at least one of its flat sides is an elongated hole 28 whose function is explained hereinafter. The intermediate part 22 can also have clamping grooves on its small sides so that if necessary it can be connected upright to another building component. Finally the intermediate part 22 has a channel 30 running parallel to and between its upper and lower sides and extending through the part by means of which it may be fastened to a further building part by means of a groove dog. Some possibilities for using the intermediate parts or adapters are represented by the embodiments explained in connection with FIGS. 8 to 24.

FIG. 3 shows a motor block, indicated generally at 32, with a rectangular housing 34 in which a small electric motor 36 is so arranged that its shaft 38 is perpendicular to the square forward surface 40 of the housing. The length of the housing edge 42 which extends perpendicular to the motor shaft corresponds again to the length of the edges 12 of the support element 10. In the housing surfaces 44 directed parallel to the motor shaft 38 are again clamping grooves 18 with T-shaped cross sections which are provided in the same way as those described for the support element 10.

On the free end of the motor shaft 38 is a small belt pulley or grooved roller 46 for driving a nonillustrated drive belt. Of course, in place of the drive pulley 46 a pinion gear can also be used.

In the case of the electric motor 36, this may be a small direct current motor with a power of for example 20 watts which is supplied from the battery arranged in the carrier element 10 or by a transformer.

Figures 4, 5:
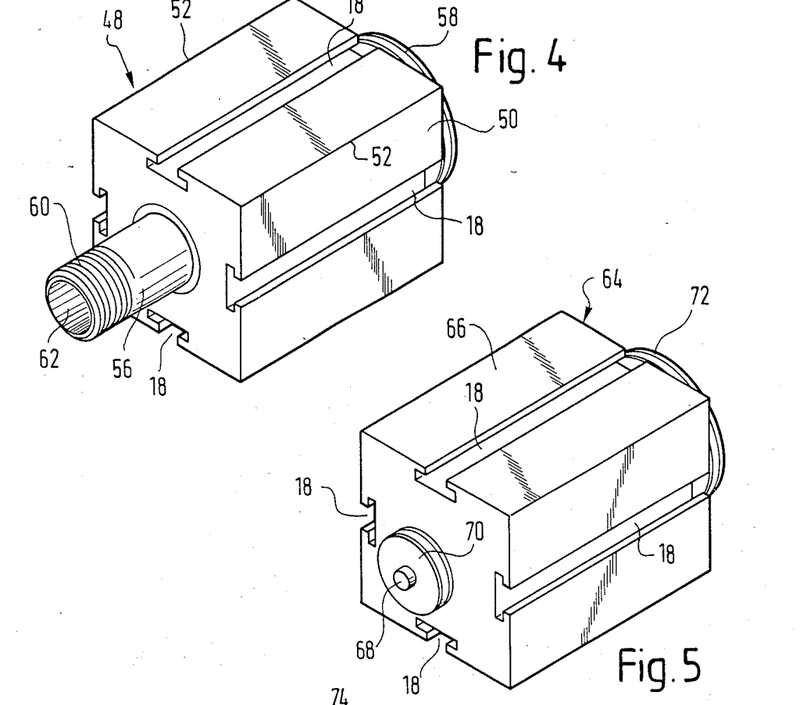

FIG. 4 shows a spindle stock 48 with a block shaped housing 50 which with respect to its exterior shape is formed in the same way as the motor housing 34 and has the same measurements as the motor housing 34 with the exception that the longitudinal edges 52 which run parallel to the clamping grooves 18 need not have the same length as the corresponding edges 54 of the motor housing 34. A hollow spindle 56 is supported in the block shaped housing 50 for free rotation about a spindle axis arranged parallel to the clamping grooves 18. As seen in FIG. 4 the right end of the spindle which projects outwardly from the housing block 50 has fastened to it a belt or cord pulley 58 by means of which the spindle 56 is for example driven by the motor 36. The left-hand end of the spindle which projects from the housing block 50 in FIG. 4 is provided with an external thread 60 onto which for example a drill chuck or lathe chuck is threadable. If desired the drill chuck or lathe chuck can also be fastened to the spindle 56 with only a clamping screw. The spindle 56 has an axial through-going bore 62 whose purpose is explained hereinafter. The spindle 56 can also be coupled in a nonillustrated way with a hand crank so that it is rotatable by hand.

FIG. 5 shows a transmission block or gear reducer 64 with a block-shaped housing 66 which in its outer shape again corresponds to the housing block 50 of the spindle stock 48. The block shaped housing 50 can have a drive including several reduction stages. In the simplest case there is a shaft 68 in the housing 66 with an axis running parallel to the clamping grooves 18 and supported for free rotation about such axis, with the shaft 68 on its ends which project outwardly from the housing block 66 carring belt or cord pulleys 70, 72 of different diameters. Also on each shaft end several belt pulleys of different diameters can be arranged coaxial to one another so that they permit different adjustment of the reduction ratio. This transmission block or gear reducer 64 can be inserted between the motor 36 and the spindle stock 48 to achieve a desired speed of the spindle from a constant motor speed. If the spindle 56 of the spindle stock 48 is provided with two belt or cord pulleys of different diameters the spindle stock can also be used as a drive block so that an individual transmission block may not be needed.

Figure 6:
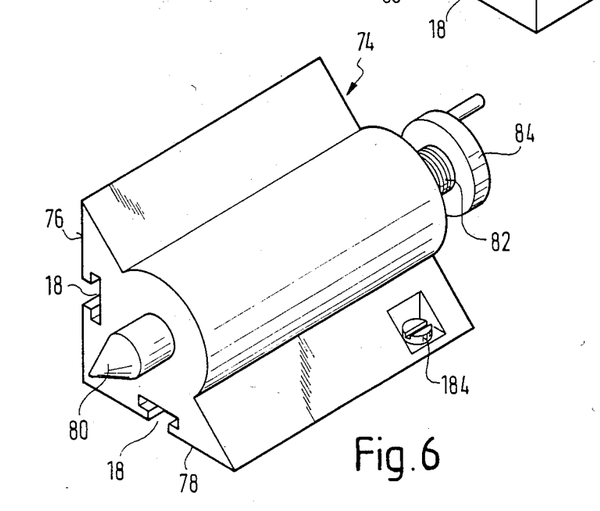

FIG. 6 shows a tail stock, designated generally by the reference number 74, which in the illustrated embodiment has an essentially triangular cross section. That is, the tail stock 74 has only two mounting surfaces 76 or 78 perpendicular to one another, in each of which a clamping groove 18 with T-shaped cross section is formed. The spindle 80 arranged parallel to the surfaces 76 and 78 of the tail stock has a threaded section 82 by means of which it is threadable into the internal thread of the tailstock so that the spindle 80 with the help of a hand wheel 84 is adjustable in the axial direction.

Figure 7:
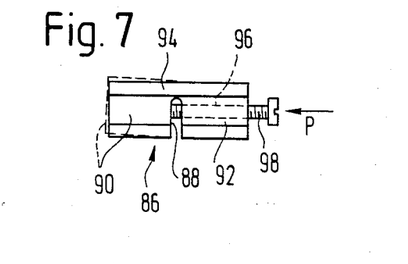
FIG. 7 is a side view of a first connecting element.
Figure 8:
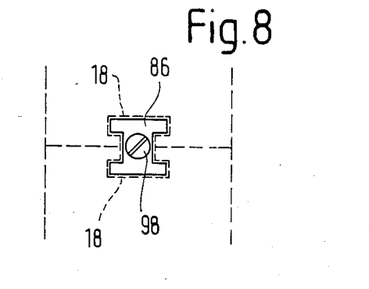
FIG. 8 is an end view of the connecting element of FIG. 7 as seen in the direction of the arrow P of FIG. 7.

FIGS. 7 and 8 show a first connecting element 86, with the help of which the previously described parts 10, 12, 32, 48, 64 and 74 can be rigidly connected with one another. The connecting element 86 consists of a plastic part with a double T-shaped section, which section corresponds to the cross section of two clamping grooves extending parallel to one another and having their openings laid adjacent to one another, as shown in FIG. 6 by broken lines for two given parts such as described in connection with FIGS. 1 to 6.

The connecting element 86 has a slot or groove 86 extending transverse to its longitudinal direction so that two portions 90 and 92 are formed which are connected to one another only by a material bridge 94, which bridge is part of one of the T webs. Because of the limited elasticity of the material used for making the connecting element 86 the remaining material bridge 94 is bendable so that the two portions 90 and 92 are pivotal relative to one another about an axis perpendicular to the drawing plane of FIG. 7.

In the portion 92 is a threaded bore 96 running parallel to the longitudinal direction and extending through the portion 92, which threaded bore 96 threadably receives a screw 98. If the screw 98 is threaded so far into the threaded bore that it presses against the portion 90 with its free end, then a further threading in of the screw 98 leads to the portion 90 being pressed away from the portion 92 and accordingly to be pivoted about the axis perpendicular to the drawing plane of FIG. 7, as indicated in FIG. 7 by the broken lines. If now the connecting element 96 is inserted into the two facing one another clamping grooves of two parts to be connected to one another, as illustrated in FIG. 8, the two parts can no longer be lifted form one another but can be slid relative to one another parallel to the groove direction. If the screw 98 in the just described situation is tightened, the deflection of the portion 90 will wedge the connecting element 86 in the two facing clamping grooves 18 so that the two parts to be connected to one another are pressed against one another. The connection can at any time be again released by loosening the screw 98. It is also to be noted that the connecting element 86 need not be placed at any definite place in the longitudinal direction of the clamping grooves. The screw 98 is at any time reachable by a screwdriver inserted longitudinally in the clamping grooves 18.

Figure 9:
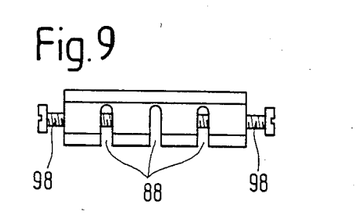
FIG. 9 is a view corresponding to that of FIG. 7 and showing a second connecting element.

FIG. 9 shows a modified form of the connecting element shown by FIGS. 7 and 8. Instead of one groove 88 three such grooves are provided so that the connecting element instead of two portions 90 and 92 has four such portions. Instead of a single screw 98 serving as the tightening element two such screws are provided, which are operable from opposite sides. The functioning of this connecting element is the same as with the connecting element 86.

Figure 10:
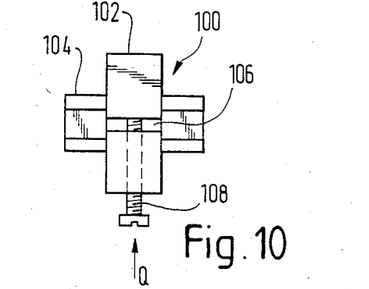
FIG. 10 is a plan view of a third embodiment of a connecting element.
Figure 11:
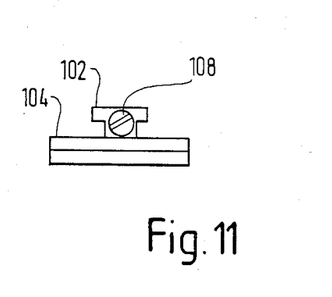
FIG. 11 is a side view of the connecting element of FIG. 10 as seen in the direction of the arrow Q of FIG. 10.

Whereas in the case of the connecting element of FIGS. 7 to 9 the clamping grooves of the two parts to be connected to one another must run parallel to one another, FIGS. 10 and 11 show a connecting element 100 with which the clamping grooves of the parts to be joined can be directed perpendicular to one another. The individual sections 102 and 104 which are insertable in the clamping grooves 18 are arranged with their longitudinal directions perpendicular to one another. In the upper individual section 102 of FIGS. 10 and 11 is a cross groove or slot 106 similar to that in the connecting elements of FIGS. 7 to 9, so that the portions of the individual section 102 so formed can be deflected away from one another by means of a screw 108 threaded into one of the portions. Upon the threading in of the screw 108 not only are the two portions of the individual section 102 bent relative to one another, but at the same time the lower individual section 104 is drawn upwardly, and therefore in the case of this connecting element 100 the two parts to be connected to one another are rigidly pressed against one another by the threading in of the screw 108.

Figure 12:
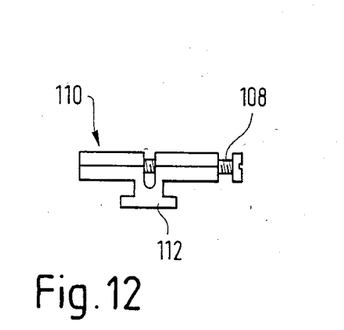
FIG. 12 is a side view of a fourth connecting element.

The connecting element 110 shown in FIG. 12 corresponds with the connecting element 100 of FIGS. 10 and 11 with regard to the individual section which receives the screw 108. The second individual section however consists of a circular T-profiled foot 112 which can be rotated if desired around an axis perpendicular to the base of the groove while the foot is in a clamping groove. Therefore it is possible to so connect two parts to one another that their clamping grooves which face one another can have any desired angle relative to one another.

Instead of a screw spreading the portions of the connecting element a screw can also be used which passes entirely through the sections of the connecting element and which engages a nut on its free end so that upon tightening of the screw the sections of the connecting element are pressed together and are thereby tilted relative to one another. Also it is conceivable to use a connecting element that is compressible between the head of the screw and a nut so that its cross sectional shape is reversibly enlarged causing it to grip the clamping grooves. All of the connecting elements are common to one another in that they are rigidly clampable in a clamping groove in any desired position of the groove and can be actuated in the longitudinal direction of the clamping groove.

Figure 13:
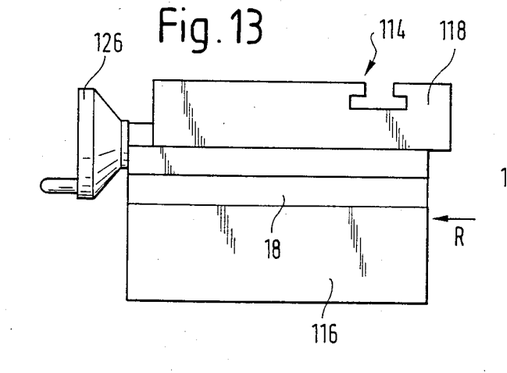
FIG. 13 is a side view of a first slide arrangement.
Figure 14:
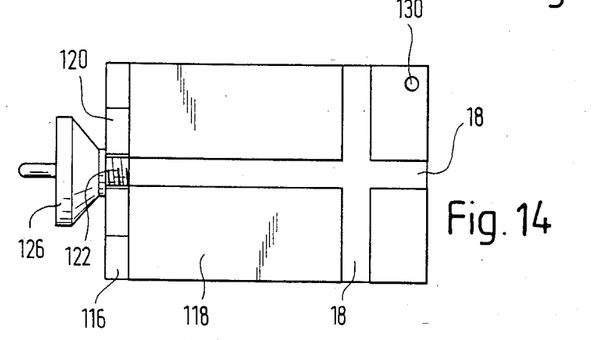
FIG. 14 is a plan view of the first slide arrangement.
Figure 15:
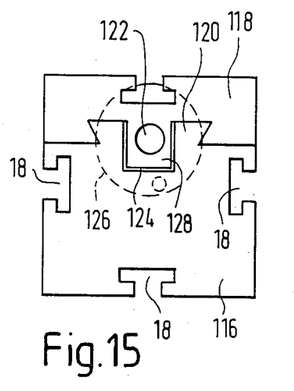
FIG. 15 is an end view of the first slide arrangement as seen in the direction of the arrow R of FIG. 13.

FIGS. 13 to 15 show a first slide arrangement which is combinable with previously described parts of the building set and which for example can be used for precision relative adjustment between a workpiece and a work tool. The slide arrangement indicated generally at 114 includes a slide carrier 116 and a slide 118 which is slidable on the slide carrier 116 by means of a dovetailed guide 120 (FIG. 15). The adjustment of the slide 118 on the slide carrier 116 is accomplished with the help of an adjusting spindle 122 which is freely rotatably supported in a groove 124 formed on the upper side of the slide carrier 116 and which is rotatable by means of a hand wheel 126 and which engages an eye 128 connected with the slide 118, which eye 128 is provided with a threaded bore (FIG. 15).

The slide arrangement 114 has—as seen in a cross section perpendicular to the adjusting spindle 122— nearly the same cross sectional dimensions as the support element 10. The slide arrangement is only slightly higher than the length of the cross sectional edges of the support element so that a part mounted on the slide does not rub on the carrier element if the slide carrier is directly fastened to the carrier element. In the outer face of the slide carrier 166 which runs parallel to the adjusting spindle 122 are again clamping grooves 18 directed parallel to the adjusting spindle, which are located midway between the two longitudinal edges of the slide carrier 116 or of the slide 118. If therefore for example the slide arrangement 114 rests flatly on a plane undersupport near the carrier element 10 the slide carrier 16 can be connected with the carrier element by means of a connecting element 86 or 110. In the upper side of the slide 118 is, according to FIG. 14, still another clamping groove 118 which is oriented perpendicular to the adjusting spindle 122. Further, in the slide 118 is a threaded bore 130 arranged perpendicular to the upper surface of the slide and near one corner thereof, which threaded bore for example can serve for clamping a tool bit between the slide 118 and a clamping shoe, as is shown hereinafter.

Figure 16:
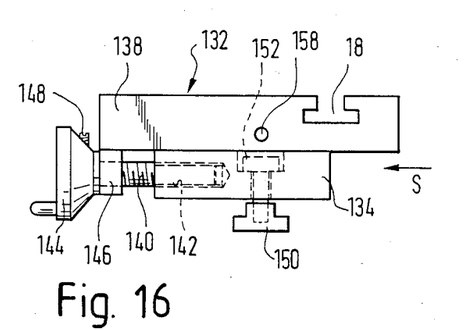
FIG. 16 is a side view of a second slide arrangement.
Figure 17:
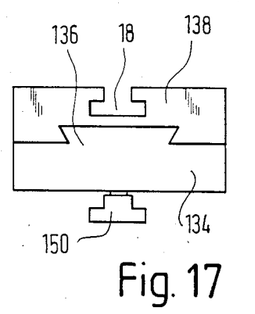
FIG. 17 is an end view of the second slide arrangement as seen in the direction of the arrow S of FIG. 16.

FIGS. 16 and 17 show a second slide arrangement, indicated generally at 132, with a plate-shaped slide carrier 134 in the middle of which a slide 138 is slidably guided by means of a dovetailed guide 136. The adjustment of the slide 138 on the slide carrier 134 is achieved by means of an adjustment spindle 140, which is threaded into a threaded bore 142 in the slide carrier 134 and which at its free end carries a hand wheel 144. The hand wheel 144 is freely rotatably supported in an eye 146 connected with the slide 138 and is connectible with the adjusting spindle 140 by means of a set screw 148. By loosening the set screw 148 the connection between the adjusting spindle and the hand wheel can be released so that the slide 138 is freely slidable relative to the slide carrier 134. An adjustment of the slide 138 can therefore for example be made with the help of an adjusting lever which is explained hereinafter in connection with one of the embodiments.

On the upper side of the slide 138 are again two clamping grooves 18 perpendicular to one another, which are similar to the ones for the slide 118 as shown in FIG. 13.

The slide carrier 138 is not fastened to the remaining parts of the construction with the help of a connecting element 186, but instead has for this purpose on its underside a T-shaped groove dog 150 which with the help of a screw 152, shown in broken line 116, can be rigidly clamped in a clamping groove 18. The screw 152 passes through the slide carrier 134 and is accessible after the slide 138 is pushed from the upper side of the slide carrier 134. This kind of fastening for the slide arrangement 100 has the advantage that the slide arrangement can be rotated about the axis of the screw 134 in a desired way so that adjustment of the slide arrangement obliquely to the clamping groove 18 in which the clamping dog 150 is positioned is possible.

Various embodiments of machine tools will now be explained in connection with FIGS. 18 to 24, which machines are assembled in general using the previously described elements of the invention. However, these figures represent only a few of the machine tools which can be constructed from the elements of the building set.

Figure 18:
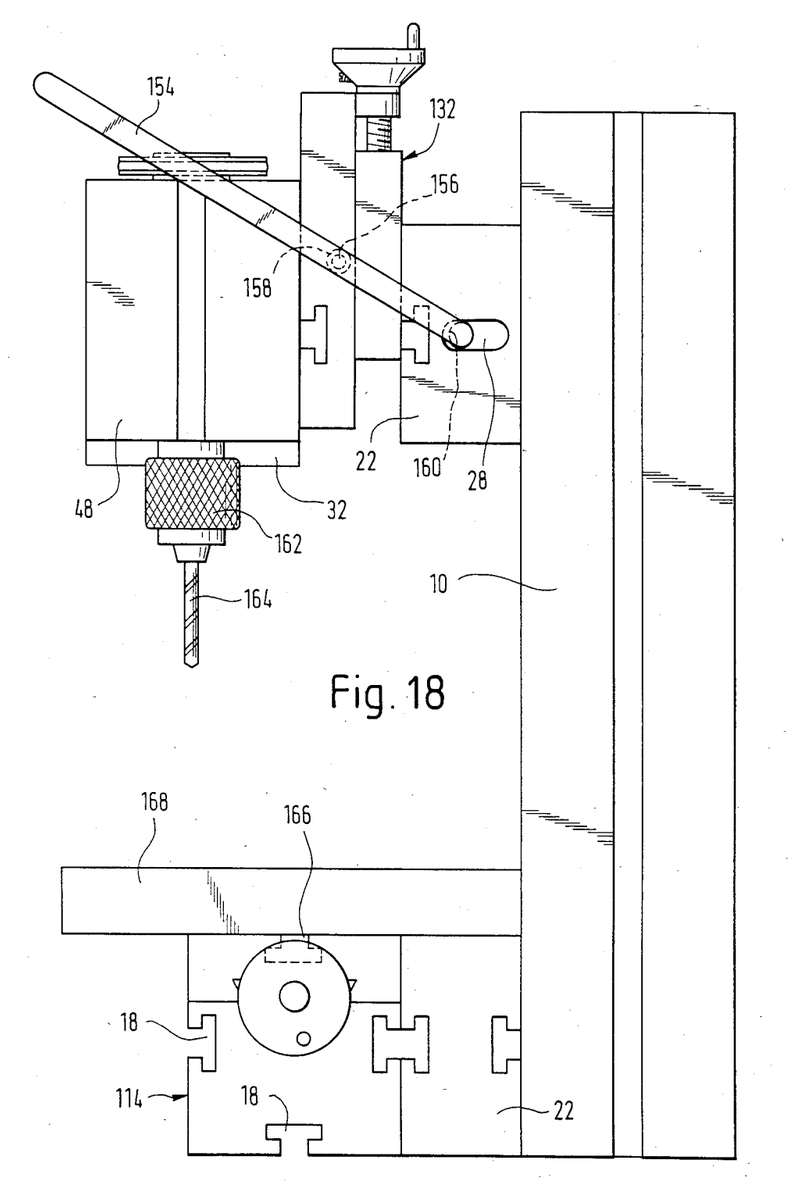
FIGS. 18 to 24 are views of different machine tools which are built by the assembly of building components according to the invention and as illustrated in FIGS. 1 to 17.

FIG. 18 shows a side view of a post-type drill press. A vertically positioned long support element 10, which is connected to the slide carrier 116 of a first slide arrangement 114 through an intermediate part 22, serves as the post, on the upper end of which a second slide arrangement 132 is likewise arranged through an intermediate part 22. On the second slide arrangement 132 the adjusting spindle is set to a nonfunctioning condition, as described above, so that the slide 138 is freely slidable on the slide carrier 134. The adjustment of the slide 138 is accomplished by means of an adjusting lever 154 which has a first pin 156 received in a lateral bore 158 in the slide 138 (see FIG. 16) and has a second pin 160 received in the elongated hole 28 in the intermediate part 22. By a pivoting of the adjusting lever in the direction of the double arrow D the slide 138 can be pushed up and down. The slide 138 carries a spindle stock 48, to which the drive motor 32 is fastened, which in FIG. 18 lies behind the spindle stock 48. The spindle 56 carries at its free end a drill chuck 162 in which a drill 164 is clamped.

On the slide 118 of the slide arrangement a drill table 168 is fastened with the help of a groove dog 166.

Figure 19:
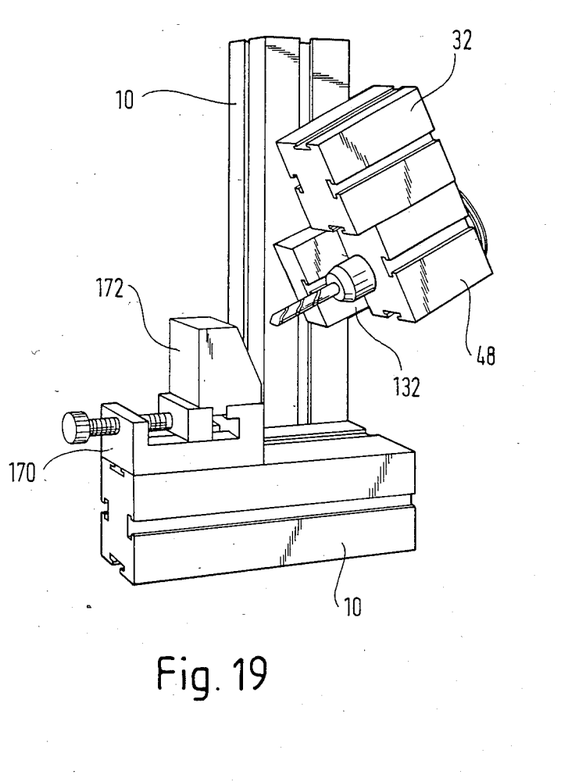

FIG. 19 shows in a perspective view a post-type drill press in which the first slide arrangement is replaced by a short support element 10. In place of the drill table a workpiece holder or threaded clamp 170 is fastened to the upper side of the horizontal support element 10, in which holder a workpiece 172 is gripped. The second slide arrangement 132 is so rotated with respect to the vertical support element 10 that drilling can now take place obliquely to the top surface of the drill table if this should be necessary with respect to the oblique face of the provided workpiece 172.

Figure 20:
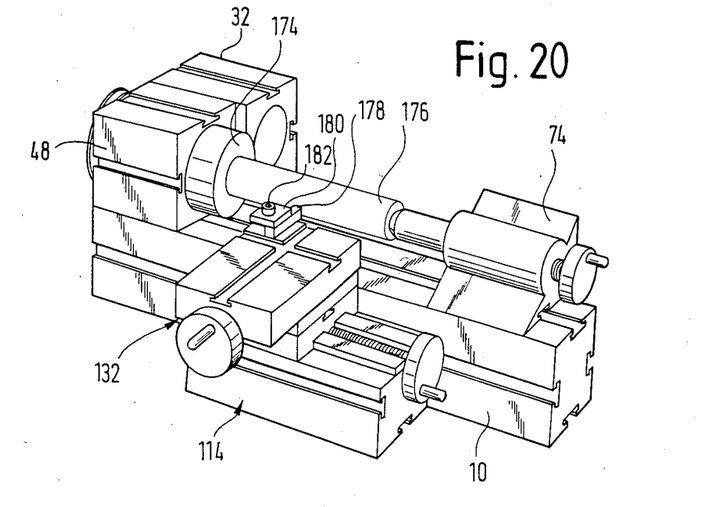

FIG. 20 shows a small lathe. A long support element 10, which rests horizontally on an undersupport, serves as the machine bed. It carries on one end a spindle stock 48, which is connected to the motor block 32 and whose spindle carries a clamping chuck 174. At the other end of the support element 10 is a tailstock 74. The workpiece 176 to be worked is gripped between the chuck 174 and the tailstock 74. On the forward side of the support element 10 and parallel to it is fastened the slide carrier 116 of a first slide arrangement 114, on whose slide 118 a second slide arrangement 132 is so fastened that its slide 138 is adjustable perpendicularly to the adjustment direction of the first slide 118. A tool bit is rigidly clamped to the second slide 138 with the help of a clamping shoe 180, which can be brought into a clamping condition by means of a screw 138 threaded into the threaded bore 130. If the adjustment path achieved for the slide with the help of the spindle drive is not sufficient, the slide carrier can be correspondingly adjusted. An important feature of the inventive building set is that the guide for the slide is not arranged on the machine bed but instead on its own slide carrier so that the machine bed is usable in a versatile manner and the slide arrangements as individual units can be attached in many different ways. In order to arrange the axis about which the workpiece rotates parallel to the movement path of the first slide 118 the tailstock can be tilted slightly with respect to the top surface of the carrier element 10 by means of a screw 184 (FIG. 6) abutting the upper surface of the carrier element 10 so that a lateral displacement of the workpiece axis is achieved.

For an idea of the sizes involved in the machine represented in FIG. 20 the following several dimensions are given. The support element 10 has a cross sectional edge length of 50 mm. With the illustrated lathe workpieces with a turning length of 170 mm. and a maximum diameter of 50 mm. can be worked. The spindle bore measures 8 mm. The longitudinal path without shifting of the slide carrier measures 50 mm. and the transverse path 25 mm.

Figure 21:
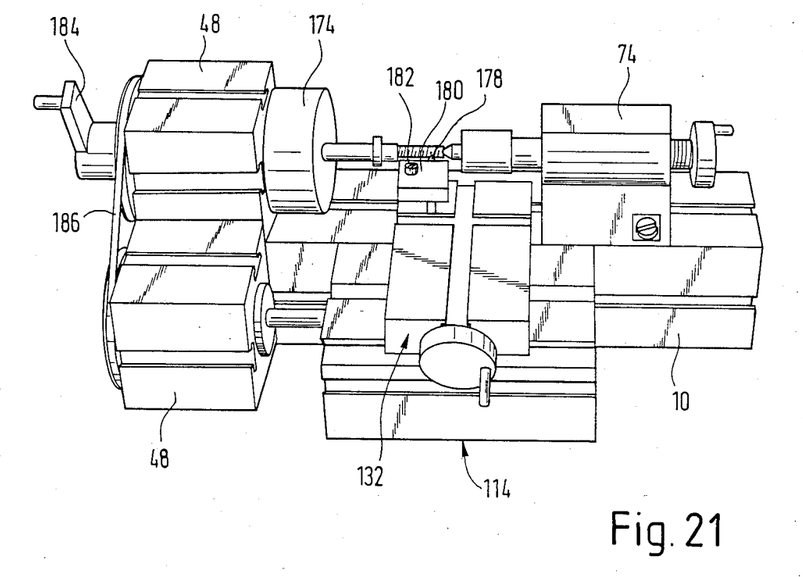

FIG. 21 shows a special realization of the lathe of Fig. 20 for cutting threads.

The drive motor is omitted. The spindle of the spindle stock 148 is provided at its rearward end with a crank 185. On the support element 10 a second spindle stock 48 is arranged in line with the first slide arrangement or longitudinal slide arrangement 114, whose spindle 56 is nonrotatably coupled with the adjusting spindle 122 of the first slide arrangement 114 for rotation therewith. The spindle of this second spindle stock 48 is driven from the spindle of the first spindle stock 48 through a belt 186 in a definite reduction ratio, whereby this reduction ratio determines the ratio of the rotational speed of the workpiece to the movement of the work tool in the axial direction of the workpiece. Since the rotational speed can be easily chosen through the hand drive the cutting of threads by unskilled persons is also possible.

For the turning of large diameter parts it is practical to place the tailstock and the chuck carrying spindle stock for example on an intermediate part so that the displacement of the turning axis from the machine bed or from the support element is correspondingly increased. In this way it is possible to turn other workpieces to a diameter of 100 mm.

Figure 22:
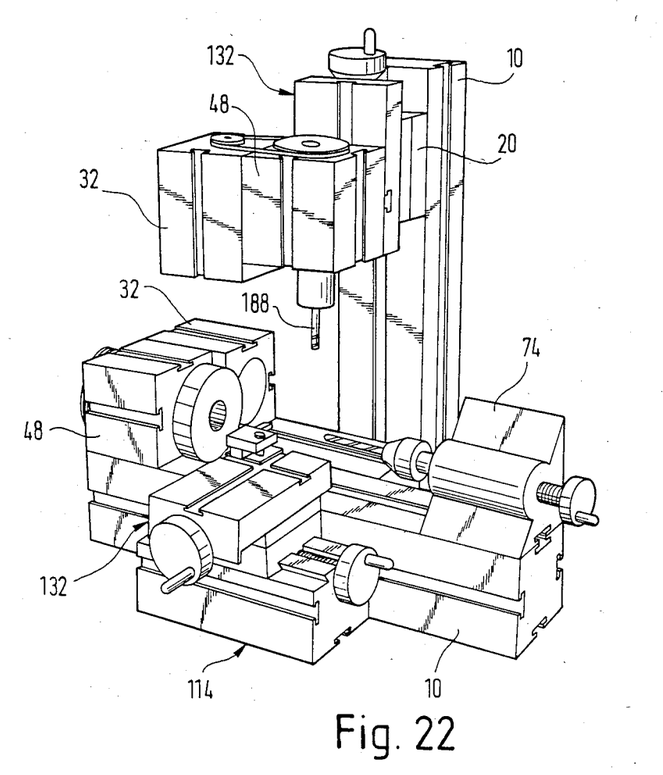

FIG. 22 shows a combination machine for turning, boring and milling. In the foreground a lathe is built up such as illustrated in FIG. 20. Only the spindle of the tailstock is provided with a drill chuck. A vertical support element 10 is fastened to the lathe as a post through a short horizontal support element 10 serving as a connecting piece, with the post carrying a second slide arrangement 132 connected to it through an intermediate part 20. The slide 132 carries a spindle stock-drive motor combination in the case of which the spindle 56 of the spindle stock 48 carries a mill 188.

Figure 23:
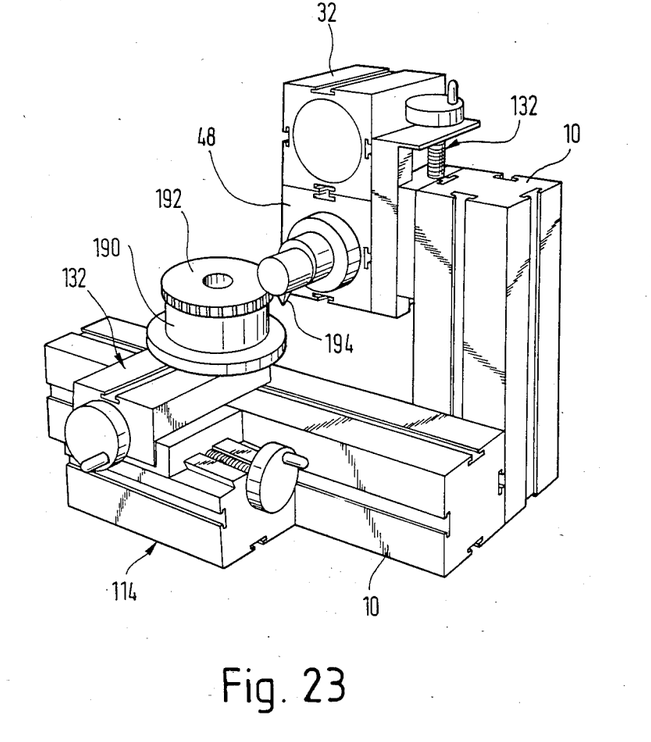

FIG. 23 shows a horizontal milling machine with a dividing head for cutting teeth with a fly cutting mill. A long horizontal support element 10 is connected with a short vertical support element 10. On the horizontal element 10 is fastened a slide combination consisting of a longitudinal slide 114 and a transverse slide 132, wherein the slide 138 of the second slide arrangement 132 carries a dividing head 190 with a gear blank 192 to be worked. On the vertical support element 10 is a second slide arrangement 132 whose slide 138 carries a spindle stock-drive motor combination. The spindle 56 is connected with a fly cutting mill 194.

Figure 24:
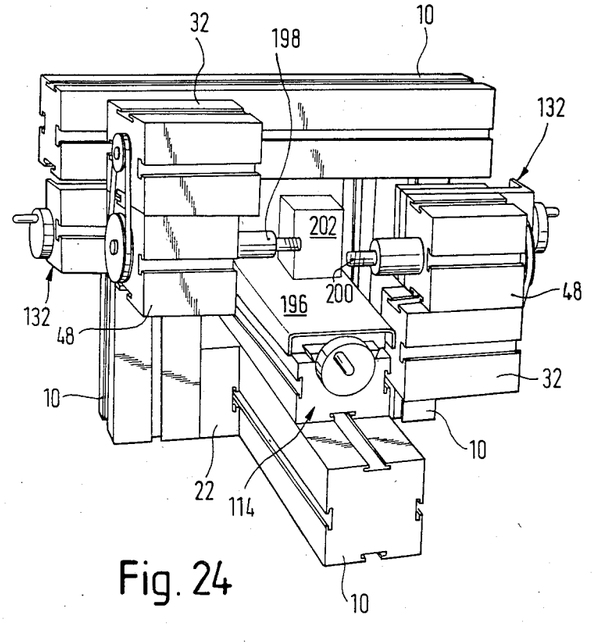

FIG. 24 finally shows a portal milling machine as an example of a complex machine tool, for simultaneously milling work pieces with two spindles. The portal consists of two vertical short support elements and a horizontal upper support element 10 which connects together the two vertical elements. For this purpose threaded holes are formed in the forward surfaces of the short support elements so that the support elements can be directly screwed to one another to form the portal. Between the lower ends of the vertical support elements lies a long support element 10 perpendicular to the plane of the portal with the connection between this support element and the vertical support elements being accomplished through two intermediate parts 22. This carrier element which rests on the underlying support surface carries a slide arrangement 114 whose slide 118 carries a long workpiece support table 196.

On the vertical support elements 10 is a second slide arrangement 132 which is so arranged that its slide 138 is movable in the direction toward the middle of the portal. The slide 138 carries a spindle stock-drive motor combination. The spindle is connectible with a mill 198 or 200 so that the workpiece 202 can be worked from both sides. As can be seen this complex machine, with the exception of the workpiece support table, consists only of the above described basic elements of the building set.

In the previous description only several machine tools have been explained which can be built from the building set of the invention. In similar ways and with the same basic elements grinding and milling machines of different types may be made which perhaps only require several similar basic elements. The assembly or construction of the machine tools can be accomplished in a simple and quick way. The machine tools so made are particularly intended for instructional purposes, model builders, hobbyists and young people, and can be used for the making of small parts of wood, plastic, aluminum, tin, bronze and also steel. The small electric motor delivers on one hand a sufficient power to work small parts of steel. On the other hand it is so weak that no especial security measures need be taken to avoid dangerous injury to a user since the motor can be held still at any time with the hand.

I claim:

1. A building set for small tool machines with at least a drive motor, a spindle stock and a support element for holding these parts, characterized in that the drive motor, the spindle stock and the support element are formed as independent parts, that the parts of the building set to be joined with one another each have a bearing surface in which at least one undercut clamping groove is formed, and in that the clamping grooves of two of the building set parts which are to be joined to one another are provided with an insertable connecting element which can be rigidly clamped in place in the clamping grooves by means of at least one tightening element, said connecting element consisting of two individual sections connected to one another the cross section of which sections corresponds to the cross section of a clamping groove, said connecting element further having at least two portions which are pivotal relative to one another by means of said tightening element about an axis perpendicular to the longitudinal direction of said sections, and said connecting element being formed of a unitary piece of plastic with said joint between said two portions being formed from a material bridge having a small thickness with respect to that of said portions.

2. A building set for small tool machines with at least a drive motor, a spindle stock and a support element for holding these parts, characterized in that the drive motor, the spindle stock and the support element are formed as independent parts, that the parts of the building set to be joined with one another each have a bearing surface in which at least one undercut clamping groove is formed, and in that the clamping grooves of two of the building set parts which are to be joined to one another are provided with an insertable connecting element which can be rigidly clamped in place in the clamping grooves by means of at least one tightening element, said connecting element consisting of two individual sections connected to one another the cross section of which sections corresponds to the cross section of a clamping groove, said connecting element further having at least two portions which are pivotal relative to one another by means of said tightening element about an axis perpendicular to the longitudinal direction of said sections, and said tightening element being a screw adjustable in the longitudinal direction of one of said sections.

* * * * *